Jan. 3, 1950    J. L. McCOY ET AL    2,493,354
MECHANICAL DEVICE FOR CONVERTING DIRECT CURRENT
INTO HIGH-FREQUENCY ALTERNATING CURRENT
Filed Nov. 27, 1948    5 Sheets-Sheet 1

Inventors
James L. McCoy
Dennison H. MacDonald
By Seymour, Earle & Nichols
Attorneys Jan. 3, 1950  J. L. McCOY ET AL  2,493,354
MECHANICAL DEVICE FOR CONVERTING DIRECT CURRENT
INTO HIGH-FREQUENCY ALTERNATING CURRENT
Filed Nov. 27, 1948  5 Sheets-Sheet 2

SET A

Inventors
James L. McCoy
Dennison H. MacDonald
by Seymour, Earle & Nichols
Attorneys.

Jan. 3, 1950   J. L. McCOY ET AL   2,493,354
MECHANICAL DEVICE FOR CONVERTING DIRECT CURRENT
INTO HIGH-FREQUENCY ALTERNATING CURRENT
Filed Nov. 27, 1948   5 Sheets-Sheet 5

THREE A.C. CYCLES FOR EACH CYCLE (REVOLUTION) OF BRUSH-UNIT

FOUR A.C. CYCLES FOR EACH CYCLE (REVOLUTION) OF BRUSH-UNIT

Inventors
James L. McCoy
Dennison H. MacDonald
by
Seymour, Earle & Nichols
Attorneys Patented Jan. 3, 1950

2,493,354

UNITED STATES PATENT OFFICE 2,493,354

MECHANICAL DEVICE FOR CONVERTING DIRECT CURRENT INTO HIGH-FREQUENCY ALTERNATING CURRENT

James L. McCoy, La Canada, Calif., and Dennison H. MacDonald, East Haven, Conn., assignors to Revere Corporation of America, Wallingford, Conn., a corporation of Connecticut Application November 27, 1948, Serial No. 62,322

7 Claims. (Cl. 321—49)

The present invention relates to improvements in devices for converting direct current into high-frequency alternating current and relates more particularly to mechanically-driven devices for effecting the conversion referred to.

It may here be explained that in situations where it is desired to locate an indicator remote from the source of the movement to be indicated, mechanically-driven devices for converting direct current into alternating current have heretofore been employed. By way of example, it has heretofore been the practice to employ a fluid meter to drive a rotary element of a current-converting device by means of the energy supplied by the movement of the fluid to be measured. The alternating-current output of such a current-converting device has been wired to a synchronous electric motor forming a feature of an indicating-device, which latter, in many instances, has been graduated in gallons or other desired units. In the manner described, the synchronous electric motor has, under favorable conditions, been kept in step with the alternating current from the current-converting device, which latter has provided a single cycle for each full revolution of the pump or its equivalent. However, when the meter or its equivalent is operating at very slow speeds, the frequency of the alternating-current output is so low as not to properly actuate a synchronous electric motor and the latter has fallen out of step with the current-converting device, owing to inadequate frequency of the alternating-current impulses.

As will be clear from the following, considered in conjunction with the accompanying drawings, the current-converting device of the present invention is characterized by providing a plurality of alternating-current cycles for each complete mechanical cycle of the current-converting device, to thereby maintain a sufficiently-high frequency of the alternating-current output to effectively actuate a synchronous electric motor or its equivalent, despite slowness of speed of the drive for the current-converting device of the present invention.

One of the main objects of the present invention is to provide simple, reliable and effective mechanically-operated current-converting means whereby direct current may be converted into alternating current of sufficient frequency to reliably maintain a synchronous electric indicating-device in accurate operation despite relatively-slow movement of the said mechanically-driven current-converting means.

Another object of the present invention is to provide simple and reliable mechanical current-converting means whereby direct current may be converted into alternating current having a frequency greater than the frequency of the cycles of operation of the said mechanical means.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes.

*The showing of Figs. 1 to 8 inclusive*

In Figs. 1 to 8 inclusive there is illustrated a current-converting device embodying the present invention and designed to produce 3-phase alternating current from a direct-current source and to multiply the frequency by eight.

The device referred to includes a contact-unit generally designated by the reference character 10 and a brush-unit generally designated by the reference character 11.

The contact-unit 10 above referred to includes a ring-like body 12 of insulating material in which are embedded eight similar sets A, B, C, D, E, F, G and H of contact-plates, each of which sets consists of nine individual contact-plates respectively designated by the reference characters 1, 2, 3, 4, 5, 6, 7, 8 and 9.

The contact-plates 1 to 9 inclusive above referred to extend in a radial direction in the body 12 and are exposed through the inner periphery of the said body in order to be sequentially engaged by a feature of the brush-unit 11 in a manner as will hereinafter appear.

Figure 5:
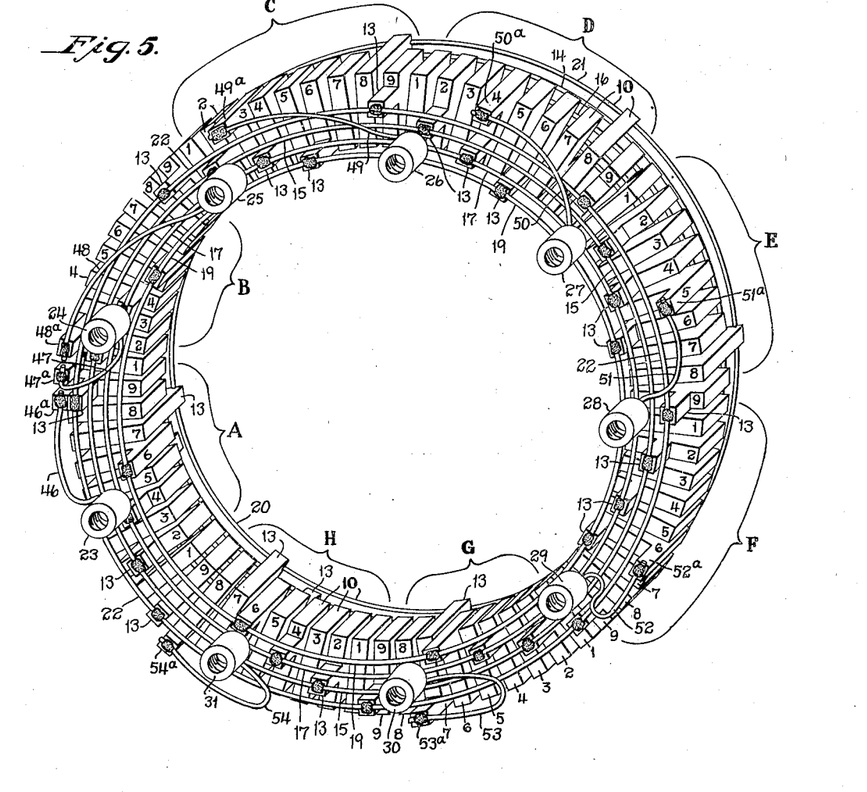
Fig. 5 is a perspective view of the contacts stripped of the insulating body, resistors and brush-unit.
Figure 6:
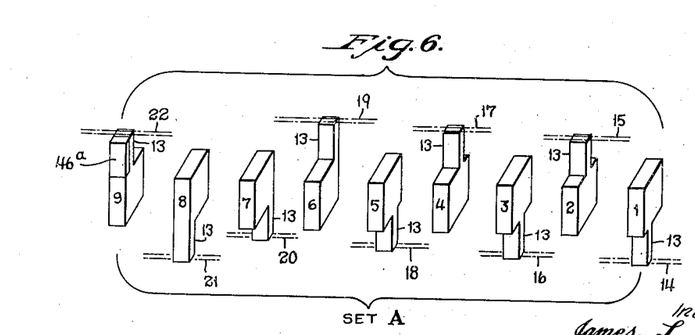
Fig. 6 is a schematic perspective view of one complete set of contacts.

Each of the contact-plates 1 to 9 inclusive is provided with an integral connector-finger 13 projecting from it in a direction paralleling the central axis of the device, as is especially well shown in Figs. 5 and 6. The respective connector-fingers 13 of the individual contact-plates 2, 4, 6 and 9 of each group A to H inclusive, extend upwardly (as viewed in the drawings) though in staggered relationship with respect to each other when considered as to circumferential arrangement. The respective connector-fingers 13 of the contact-plates 1, 3, 5, 7 and 8 of each group A to H inclusive, extend downwardly though also in staggered relationship relative to each other when considered as to circumferential arrangement.

As thus arranged, the connector-fingers 13 of each contact-plate 1 of each group A to H inclusive, are in circumferential alignment below the general plane of the said contact-plates. Similarly, the respective connector-fingers 13 of each contact-plate 2 are in circumferential alignment with each other, as is also the case with the respective connector-fingers 13 of the contact-plates 3 to 9 inclusive.

In brief, the connector-finger 13 of a given contact-plate is in circumferential alignment with the connector-finger of each similar contact-plate in all of the groups A to H inclusive.

The downwardly-extending connector-finger 13 of each contact-plate 1 is electrically interconnected by an interconnector-ring 14 located adjacent the lower face of the body 12. The connector-finger 13 of each contact-plate 2 is electrically interconnected with the like numbered contact-plates of the other groups by means of an interconnector-ring 15 located adjacent the upper face of the body 12. Similarly, each downwardly-extending connector-finger 13 of the contact-plates 3 is electrically interconnected by means of an interconnector-ring 16. The upwardly-extending connector-finger 13 of each contact-plate 4 is interconnected with all similar connector-fingers by means of an interconnector-ring 17.

The downwardly-extending connector-finger 13 of each contact-plate 5 is connected to the remaining seven similar connector-fingers by means of an interconnector-ring 18 located adjacent the underface of the body 12 but displaced in a radial direction from the previously mentioned connector-rings 14 and 16. The respective upwardly-extending connector-fingers 13 of the eight contact-plates 6 (one contact-plate 6 being located in groups A to H inclusive) are substantially flush with the inner periphery of the body 12 and are electrically interconnected by a connector-ring 19 located adjacent the upper face of the body 12.

Instead of extending upwardly, the next group of connector-fingers 13, namely, those forming an integral part respectively of the contact-plates 7, extend downwardly in position where their respective inner edges are flush with the inner edges of the particular plates 7 of which they form a feature, as well as flush with the inner periphery of the ring-like body 12. Each of the connector-fingers 13 last referred to is electrically interconnected by an interconnector-ring 20 located adjacent the underface of the body 12. The respective connector-fingers 13 of each of the contact-plates 8 also extend downwardly but in a location wherein their respective outer edges are substantially flush with the outer edge of each of said plates 8 where they are electrically interconnected by means of an interconnector-ring 21.

The connector-fingers 13 of the contact-plates 9 extend upwardly and each is connected to every other similar connector-finger by means of an interconnector-ring 22.

The various interconnector-rings 14 to 22 inclusive may be soldered or otherwise securely electrically connected to the connector-fingers 13 with which they register, and as will be noted by reference to Fig. 5 in particular, four of such interconnector-rings are located adjacent the upper surface of the contact-unit 10 while the remaining five thereof are located adjacent the underface of the said contact-unit, as viewed in the drawings.

Molded into the upper portion of the ring-like body 12 in circumferentially-spaced relationship are nine cup-shaped sockets 23, 24, 25, 26, 27, 28, 29, 30 and 31. Each of the said sockets is internally threaded and has its open upper edge substantially flush with the upper surface of the body 12 and has its lower extremity out of direct electrical engagement with the upper series of connector-rings 15, 17, 19 and 22, as may be seen by reference to Fig. 3.

Each socket 23 to 31 inclusive is adapted to have its threaded interior receive the lower end of one of nine similar attaching-screws 32, each of which latter is adapted to extend axially through one of nine similar resistors 33, 34, 35, 36, 37, 38, 39, 40 and 41.

Figure 2:
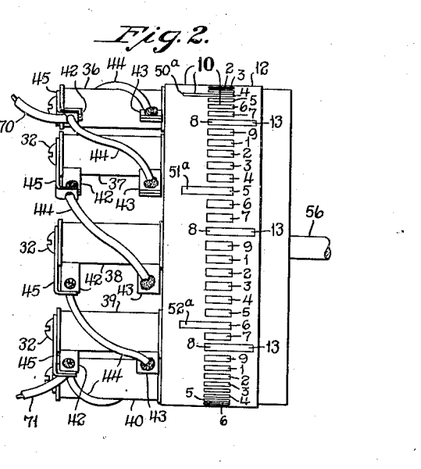
Fig. 2 is a view thereof in side elevation.
Figure 3:
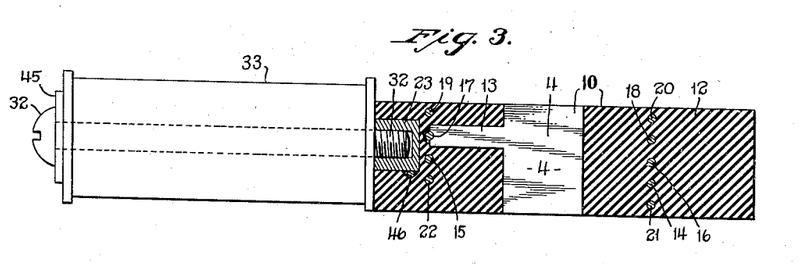
Fig. 3 is a sectional view taken on the line 3—3 of Fig. 1, but on a larger scale.

The resistors 33 to 41 inclusive may be of any standard form and each thereof has an upper terminal 42 and a lower terminal 43, as is especially well shown in Fig. 2. The upper terminal of each resistor is connected by means of a wire 44 to the lower terminal 43 of the next-adjacent resistor, as is also clearly indicated in Fig. 2. The upper terminal 42 of each resistor 33 to 41 inclusive is also electrically connected by means of an L-shaped plate 45 to the particular one of the attaching-screws 32 which serves to retain the given resistor in mechanically- and electrically-coupled relationship with the aligned or registering one of the sockets 23 to 31 inclusive.

The sockets 23 to 31 inclusive before referred to are respectively connected by means of wires 46, 47, 48, 49, 50, 51, 52, 53 and 54, to connector-fingers respectively designated by the reference characters 46a, 47a, 48a, 49a, 50a, 51a, 52a, 53a and 54a. The said connector-fingers may be soldered, welded or otherwise made unitary respectively with the contact-plates 9, 1, 2, 3, 4, 5, 6, 7 and 8 respectively of the group A to H inclusive, as is especially well shown in Fig. 5. A given socket 23 to 31 inclusive is thus directly electrically connected to a given contact-plate and hence, through the intermediary of the appropriate one of the interconnector-rings 14 to 22 inclusive, to each and every similarly-numbered contact-plate of the respective groups A to H inclusive.

Figure 4:
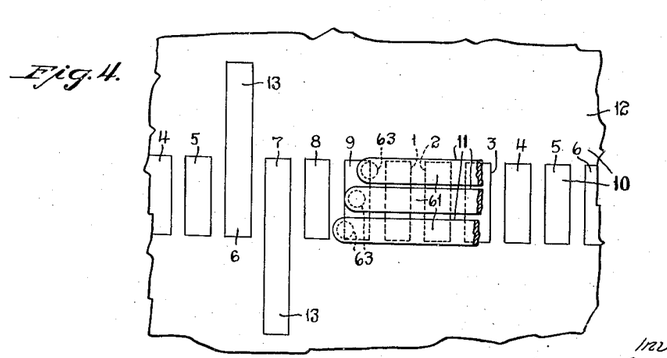
Fig. 4 is a broken elevational view of a local inner area of the device as indicated by the line 4—4 of Fig. 1.

The brush-unit above described and which is generally designated by the reference character 11, includes a brush-head 55 which is secured to one end of a drive-shaft 56 projecting centrally into the interior of the ring-like contact-unit 10. The said brush-head is formed of insulating material and has molded into it at substantially diametrically-opposite points two sockets 57 and 58 (Fig. 1) extending radially and respectively receiving screws 59 and 60. The screws 59 and 60 just referred to respectively extend inwardly through flexible brushes 61 and 62. The outer or free end of each of the brushes 61 and 62 is trifurcated and provided with three contacts 63 (Fig. 4) adapted to sequentially engage the inner edges of all of the contact-plates 1 to 9 inclusive of each and every group A to H inclusive thereof. Preferably, the three contacts 63 at the trifurcated free end of each of the brushes 61 and 62 are staggered, as is shown in Fig. 4, so that electrical engagement will not be lost with any given contact-plate before engagement has been effected with the next-adjacent contact-plate.

Figure 1:
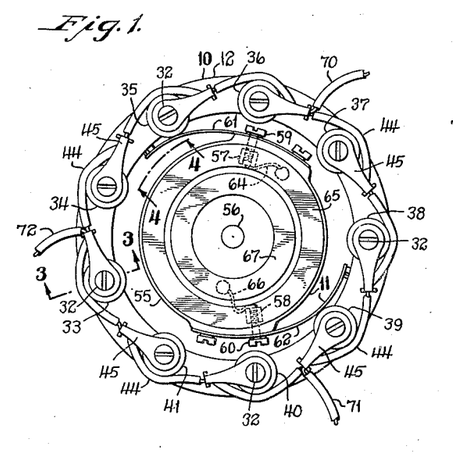
Fig. 1 is a top or plan view of a mechanical current-converting means designed and adapted to convert direct current into 3-phase alternating current at the rate of eight cycles of alternating current for each single cycle of the mechanically-driven brush-unit.
Figure 7:
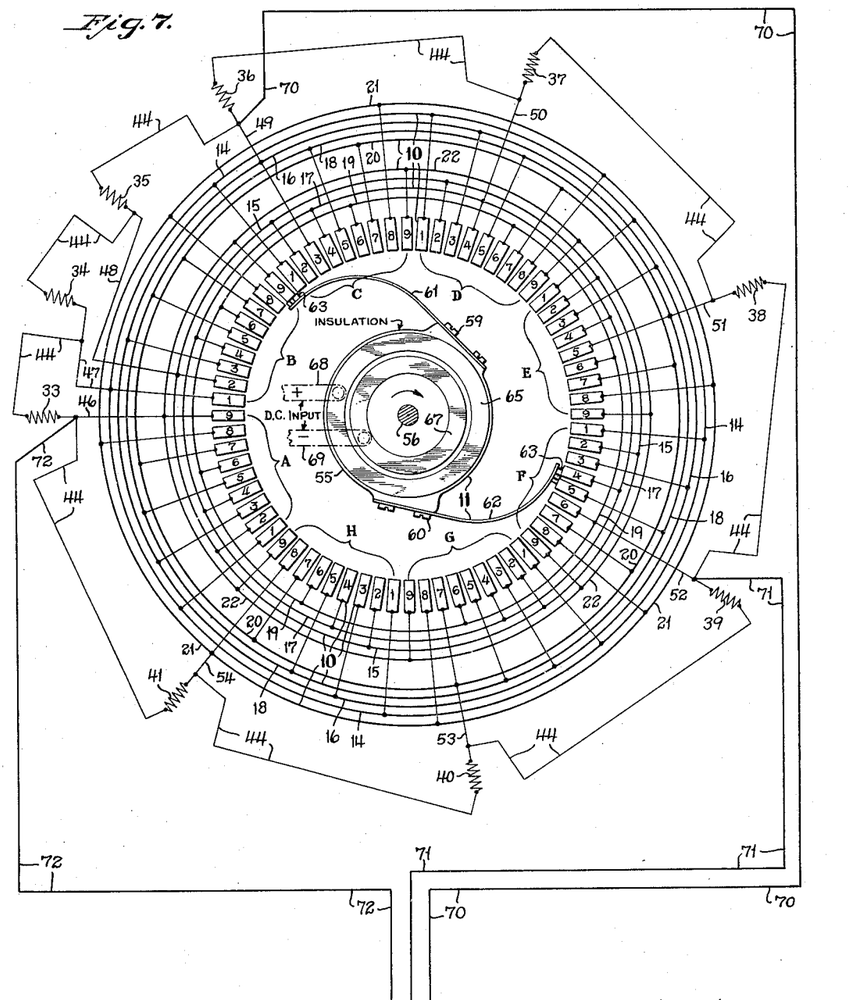
Fig. 7 is a schematic view illustrating the plurality of sets of contacts and their various interconnections, together with the brush-unit.

The socket 57 to which the brush 61 is electrically connected is, in turn, electrically connected by means of a wire 64 to an outer contact-ring 65 carried on the face of the brush-head 55, as is indicated in Figs. 1 and 7. Similarly, the socket 58 to which the brush 62 is electrically connected is, in turn, electrically connected by means of a wire 66 (Fig. 1) to an inner contact-ring 67 mounted on a face of the brush-head 55 before referred to.

The contact-rings 65 and 67 above described of the brush-unit 11 may have sliding engagement with any suitable brush-means leading from a source of direct current such, for instance, as the brushes 68 and 69 indicated by broken lines in Fig. 7.

In the instance shown, the mean distance between the contacts 63 of the brush 61 and the similar contacts of the brush 62, is substantially 180 electrical degress.

Connected to the L-shaped plate 45 mounted on the top of the resistor 36, is an alternating-current output-wire 70, which latter constitutes one of a set of three alternating-current output-wires, the remaining two of which are respectively numbered 71 and 72. The output-wire 70 is thus electrically connected (without the intervention of any resistors) through the intermediary of the adjacent attaching-screw 32, socket 26 and wire 49 to the contact-plate 3 of the group C thereof. Since the contact-plate 3 just referred to is electrically interconnected by means of the connector-ring 16 to every other contact-plate 3, it follows that the output-wire 70 is also directly electrically connected (without the intervention of any resistors) to each contact-plate 3 of each and every group A to H inclusive.

The alternating-current output-wire 71 above referred to is connected to the L-shaped plate 45 mounted on the top of the resistor 39, and hence is electrically connected (without the intervention of any resistors) through the intermediary of the adjacent attaching-screw 32, socket 29 and wire 52, to the contact-plate 6 of the group F thereof. Since the contact-plate 6 just referred to is electrically interconnected by means of the connector-ring 19 to every other contact-plate 6, it follows that the output-wire 71 is also directly electrically connected (without the intervention of any resistors) to each contact-plate 6 of each and every group A to H inclusive.

The remaining alternating-current output-wire 72 above referred to is connected to the L-shaped plate 45 mounted on the top of the resistor 33. The output-wire 72 is thus electrically connected (without the intervention of any resistors) through the intermediary of the adjacent attaching-screw 32, socket 23 and wire 46, to the contact-plate 9 of the group A thereof. Here, also, since the contact-plate 9 just referred to is electrically interconnected by means of the connector-ring 22 to every other contact-plate 9, it follows that the output-wire 72 is also directly electrically connected (without the intervention of any resistors) to each contact-plate 9 of each and every group A to H inclusive.

*The operation of the structure of Figs. 1 to 8 inclusive*

For purposes of convenience of description, it may be assumed that the drive-shaft 56 is connected in any suitable manner to a pump or other desired device so that the said shaft and hence the entire brush-unit 11 is rotated by the said pump or the like. It will be obvious, however, that if desired, the brush-unit 11 may be held stationary and the contact-unit rotated with respect thereto.

As the brush-unit 11 is turned, as above described, it will cause its contacts 63 to successively sweep over the exposed inner faces of the contact-plates 1 to 9 inclusive of each and every group A to H thereof. Inasmuch as the respective contacts 63 of the flexible brushes 61 and 62 are connected to a source of direct current through the intermediary of the D. C. brushes 68 and 69, contact-rings 65 and 67 and the parts 57, 58, 59, 60, 64 and 66, alternating current will be supplied to the output-wires 70, 71 and 72.

Assuming that the direct-current voltage applied to the brushes 68 and 69 is about 24 volts, the 3-phase output will be at approximately 12 volts when each of the resistors 33 to 41 inclusive has a resistance of approximately 50 ohms and the current demand upon the output-wires 70, 71 and 72 is approximately one ampere.

Figure 8:
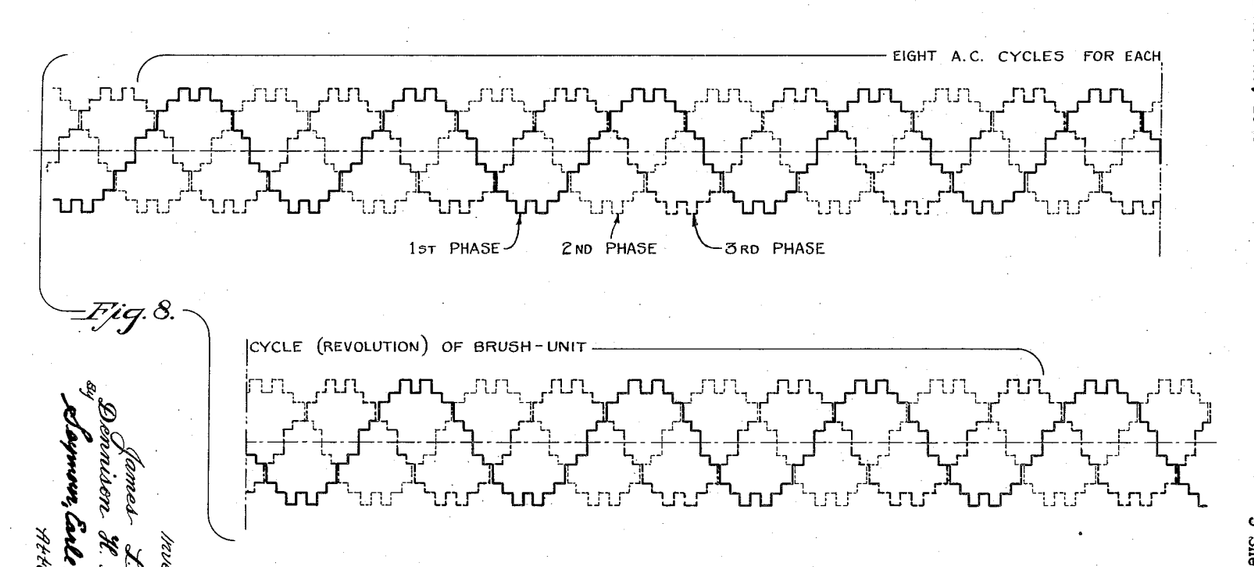
Fig. 8 is a diagrammatic view indicating the wave-forms produced by the structure of the preceding figures.

Due to the fact that there are three times as many contact-plates (1 to 9 inclusive) in each group of contact-plates A to H inclusive as there are phases, the alternating-current output will assume substantially the stepped wave of forms indicated in Fig. 8. In Fig. 8, each of the three phases is respectively indicated by a different type of line, and to avoid overlapping of such lines, they are shown as slightly displaced with respect to each other at locations where loss of identity would occur. By providing the stepped wave-forms shown, better synchronizing characteristics are provided than would be the case were there but three contact-plates (one for each phase) in each group A to H inclusive.

By the construction and arrangement of parts shown, each single revolution or cycle of rotation of the brush-unit 11 will produce a plurality of alternating-current cycles in the output-wires. In the instance illustrated, the output will be eight cycles of alternating current for each cycle of movement of the brush-unit 11. As will be obvious, the multiplication ratio may be lesser or greater, according to the number of sets of contact-plates or their equivalent which are provided in the device.

Figure 9:
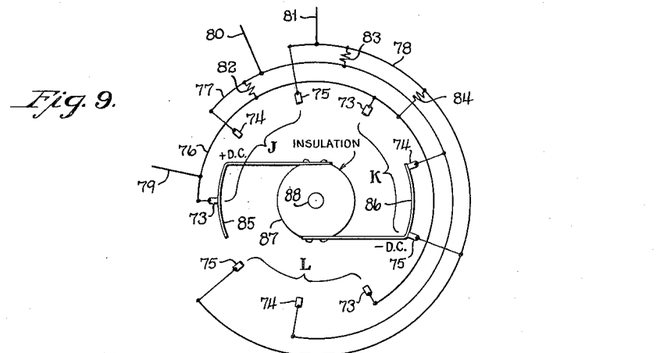
Fig. 9 is a schematic view illustrating a device embodying the present invention and adapted to convert direct current into 3-phase alternating current at the rate of three cycles of alternating current for each single cycle of the brush-unit.
Figure 10:
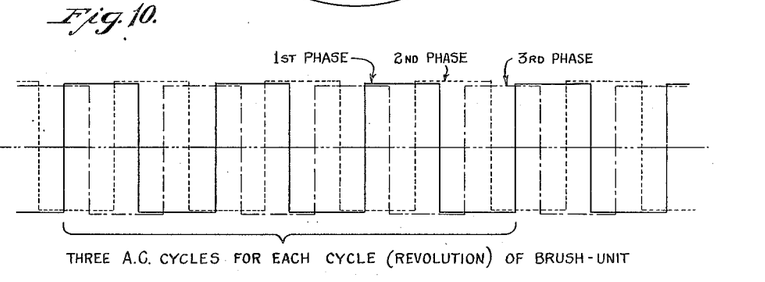
Fig. 10 is a diagrammatic view indicating the wave-forms produced by the structure of Fig. 9.

The showing of Figs. 9 and 10

In Fig. 9 is schematically illustrated a mechanically-driven device for converting direct current into relatively-high frequency alternating current. The alternating-current output is 3-phase and the multiplication ratio is three complete cycles for each single cycle of rotation of the brush-unit illustrated.

In the instance shown, the contact-unit includes three groups J, K, and L of contact-plates 73, 74 and 75. The respective contact-plates 73 of each of the groups J, K and L are electrically connected together by an interconnector-ring 76, as is indicated in Fig. 9. In a similar manner, the respective contact-plates 74 of each of the groups J, K and L are electrically interconnected by an interconnector-ring 77. An interconnector-ring 78 serves to connect together the respective contact-plates 75 of each of the groups J, K and L.

Alternating-current output-wires 79, 80 and 81 are respectively connected to the interconnector-rings 76, 77 and 78. The interconnector-ring 76 is connected to the interconnector-ring 77 by means of a resistor 82 and the latter interconnector-ring is connected to the interconnector-ring 78 by means of a resistor 83. A resistor 84 serves to connect the interconnector-rings 78 and 76, as is indicated in Fig. 9.

The brush-unit indicated in Fig. 9 includes two complemental resilient brushes 85 and 86 respectively located substantially diametrically opposite each other and secured to a brush-head 87 formed of insulating material. The said brush-head is rigidly carried by a drive-shaft 88 by means of which the brush-unit may be rotated with respect to the contact-plates 73, 74 and 75 previously described.

A source of direct current may be connected to the brushes 85 and 86 in any suitable manner (not shown) and when the said brushes are caused to move sequentially over the contact-plates 73, 74 and 75 of each of the groups J, K and L, three 3-phase cycles will be supplied to the outlet-wires 79, 80 and 81 for each single cycle of revolution of the said brushes. The wave-forms will be substantially as indicated in Fig. 10, in which each of the three phases are respectively indicated by lines of different characters which, in certain locations, are slightly spaced from each other for purposes of clarity, though normally the said lines would be superimposed one upon another.

Figure 11:
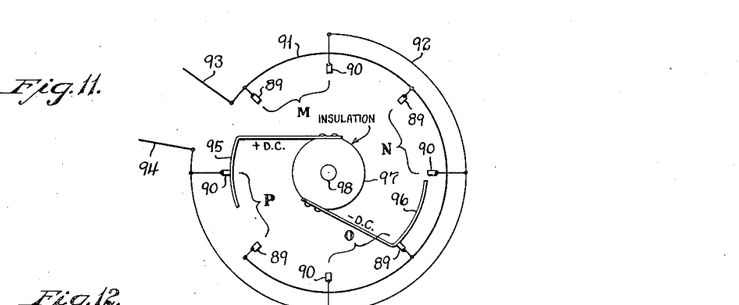
Fig. 11 is a schematic view illustrating a device embodying the present invention and adapted to produce four complete cycles of single-phase alternating current for each single cycle of the brush-unit.
Figure 12:
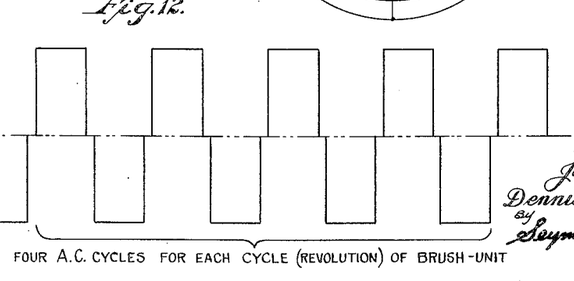
Fig. 12 is a diagrammatic view indicating the wave-forms produced by the structure of Fig. 11.

The showing of Figs. 11 and 12

In Fig. 11 is schematically illustrated a mechanically-driven device for converting direct current into single-phase alternating current of relatively-high frequency. As will be apparent from the following, the single-phase alternating-current output will have four cycles for each cycle of revolution of a brush-unit.

In the instance shown, there is employed a contact-unit which includes four groups M, N, O and P, each consisting of two contact-plates 89 and 90. The respective contact-plates 89 of each of the groups M, N, O and P are connected together by means of an interconnector-ring 91. Similarly, the respective contact-plates 90 of each of the groups M, N, O and P are connected together by means of an interconnector-ring 92.

The interconnector-ring 91 has connected to it an outlet-wire 93 and, similarly, the interconnector-ring 92 has connected to it an outlet-wire 94. The said outlet-wires 93 and 94 may be extended to any desired alternating-current device.

Adapted to sequentially engage with the contact-plates 89 and 90 are two resilient brushes 95 and 96, both carried by a brush-head 97 formed of insulating material and rigidly mounted upon a drive-shaft 98, as is indicated in Fig. 11.

Each brush 95 and 96 is of such length in a circumferential direction as to slightly fall short of simultaneously engaging two adjacent contact-plates.

The brushes 95 and 96 may be connected in any suitable manner to a source of direct current and when jointly caused to ride over the contact-plates 89 and 90 by the turning movement of the drive-shaft 98, a single-phase alternating current will be supplied to the outlet-wires 93 and 94 and the wave-form will assume substantially the shape indicated in Fig. 12.

Résumé

It will be apparent from the foregoing that all three of the forms of the present invention illustrated in the accompanying drawings, are characterized by a contact system of 720 electrical degrees or more so that a plurality of alternating-current cycles is provided for each and every cycle (revolution) of any given brush-unit.

In the above manner, a pump or the like when connected to a given brush-unit to drive the same, may slow down to its lower operating speeds without, at the same time, slowing-down the frequency of the output to such a degree as to fail to properly actuate a synchronous electric motor.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

We claim:

1. A mechanical device for converting direct current into high-frequency polyphase alternating current, including in combination: a plurality of frequency-multiplying sets of contacts arranged in sequence and each of said sets corresponding in number of contacts to the number of contacts in the other of said sets, the number of said sets of contacts being a multiple of the phase of the desired polyphase alternating current; a plurality of electrical interconnectors respectively connecting together similar contacts of each of said sets to provide a contact system of 720 electrical degrees or more for each of said polyphases; a plurality of electrical take-offs respectively connected to the said electrical interconnectors to convey polyphase alternating current therefrom to a desired alternating-current device; resistance-means having a greater resistance than the said interconnectors and electrically connecting the same together; and a pair of complemental mechanically-driven brushes constructed and arranged to successively sweep over the said plurality of said sets of contacts to supply direct current thereto; whereby each complete cycle of movement of the said complemental brushes with respect to the said plurality of sets of contacts provides a plurality of polyphase alternating-current cycles to the said electrical take-offs.

2. A mechanical device for converting direct current into high-frequency polyphase alternating current, including in combination: a plurality of frequency-multiplying sets of contacts arranged in sequence in annular form and each of said sets corresponding in number of contacts to the number of contacts in the other of said sets, the number of said sets of contacts being a multiple of the phase of the desired polyphase alternating current; a plurality of electrical interconnector-rings respectively connecting together similar contacts of each of said sets to provide a contact system of 720 electrical degrees or more; a plurality of electrical take-offs respectively connected to the said interconnector-rings to convey polyphase alternating current therefrom to a desired alternating-current device; and a rotary brush-carrier having a pair of complemental brushes constructed and arranged to successively sweep over the said annularly-arranged sets of contacts to supply direct current thereto; whereby each complete revolution of the said complemental brushes with respect to the said plurality of sets of contacts provides a plurality of polyphase alternating-current cycles to the said electrical connectors.

3. A mechanical device for converting direct current into high-frequency polyphase alternating current, including in combination: a plurality of frequency-multiplying sets of contacts arranged in sequence in annular form and each of said sets corresponding in number to the number of contacts in the other of said sets, the number of said sets of contacts being a multiple of the phase of the desired polyphase alternating current; a plurality of electrical interconnector-rings respectively connecting together similar contacts of each of said sets to provide a contact system of 720 electrical degrees or more; a plurality of electrical take-offs respectively connected to the said interconnector-rings to convey polyphase alternating current therefrom to a desired alternating-current device; resistance-means having a greater resistance than the said interconnector-rings and electrically connecting the same together; and a rotary brush-carrier having a pair of complemental brushes constructed and arranged to successively sweep over the said annularly-arranged sets of contacts to supply direct current thereto; whereby each complete revolution of the said complemental brushes with respect to the said plurality of sets of contacts provides a plurality of polyphase alternating-current cycles to the said electrical take-offs.

4. A mechanical device for converting direct current into high-frequency alternating current, including in combination: a plurality of frequency-multiplying sets of contacts arranged in sequence and each of said sets corresponding in number of contacts to the number of contacts in the other of said sets, each of said contacts having a projecting connector-lug, each given contact of a given set thereof having its connector-lug in alignment with the connector-lug of the similar contact of the other of said sets of contacts and out of alignment with the connector-lugs of dissimilar contacts; a plurality of electrical interconnectors corresponding in number to the number of contacts in any given set thereof and respectively connected to the connector-lugs of similar contacts of all of said sets to provide a contact system of 720 electrical degrees or more; a plurality of electrical take-offs respectively connected to said interconnectors to convey alternating current therefrom to a desired alternating current device; and a pair of complemental mechanically-driven brushes constructed and arranged to successively sweep over the said plurality of sets of contacts to supply direct current thereto; whereby each complete cycle of movement of the said complemental brushes with respect to the said plurality of sets of contacts provides a plurality of alternating-current cycles to the said electrical take-offs.

5. A mechanical device for converting direct current into high-frequency alternating current, including in combination: a plurality of frequency-multiplying sets of contacts arranged in sequence and each of said sets corresponding in number of contacts to the number of contacts in the other of said sets, each of said contacts having a projecting connector-lug, each given contact of a given set thereof having its connector-lug in alignment with the connector-lug of the similar contact of the other of said sets of contacts and out of alignment with the connector-lugs of dissimilar contacts; a plurality of electrical interconnectors corresponding in number to the number of contacts in any given set thereof and respectively connected to the connector-lugs of similar contacts of all of said sets to provide a contact system of 720 electrical degrees or more; a plurality of electrical take-offs respectively connected to said interconnectors to convey alternating current therefrom to a desired alternating current device; resistance-means having a greater resistance than the said interconnectors and electrically connecting the same together; and a pair of complemental mechanically-driven brushes constructed and arranged to successively sweep over the said plurality of sets of contacts to supply direct current thereto; whereby each complete cycle of movement of the said complemental brushes with respect to the said plurality of sets of contacts provides a plurality of alternating-current cycles to the said electrical take-offs.

6. A mechanical device for converting direct current into high-frequency alternating current, including in combination: a plurality of frequency-multiplying sets of contacts arranged in sequence in annular form and each of said sets corresponding in number of contacts to the number of contacts in the other of said sets, each of said contacts having a projecting connector-lug, each given contact of a given set thereof having its connector-lug circumferentially in line with the connector-lug of the similar contact of the other of said sets of contacts and circumferentially out of line with the connector-lugs of dissimilar contacts; a plurality of electrical interconnector-rings corresponding in number to the number of contacts in any given set thereof and respectively connected to the connector-lugs of similar contacts of all of said sets to provide a contact system of 720 electrical degrees or more; a plurality of electrical take-offs respectively connected to said interconnector-rings to convey alternating current therefrom to a desired alternating-current device; and a rotary brush-carrier having a pair of complemental brushes constructed and arranged to successively sweep over the said annularly-arranged sets of contacts to supply direct current thereto; whereby each complete revolution of the said complemental brushes with respect to the said plurality of sets of contacts provides a plurality of alternating-current cycles to the said electrical take-offs.

7. A mechanical device for converting direct current into high-frequency alternating current, including in combination: a plurality of frequency-multiplying sets of contacts arranged in sequence in annular form and each of said sets corresponding in number of contacts to the number of contacts in the other of said sets, each of said contacts having a projecting connector-lug, each given contact of a given set thereof having its connector-lug circumferentially in line with the connector-lug of the similar contact of the other of said sets of contacts and circumferentially out of line with the connector-lugs of dissimilar contacts; a plurality of electrical interconnector-rings corresponding in number to the number of contacts in any given set thereof and respectively connected to the connector-lugs of similar contacts of all of said sets to provide a contact system of 720 electrical degrees or more; a plurality of electrical take-offs respectively connected to said interconnector-rings to convey alternating current therefrom to a desired alternating current device; resistance-means having a greater resistance than the said interconnector-rings and electrically connecting the same together; and a rotary brush-carrier having a pair of complemenetal mechanically-driven brushes constructed and arranged to successively sweep over the said annularly-arranged sets of contacts to supply direct current thereto; whereby each complete revolution of the said complemental brushes with respect to the said plurality of sets of contacts provides a plurality of alternating-current cycles to the said electrical take-offs.

JAMES L. McCOY.
DENNISON H. MacDONALD.

No references cited.